United States Patent [19]

Hamley

[11] Patent Number: 4,764,812
[45] Date of Patent: Aug. 16, 1988

[54] SELECTION OF VIDEO SOURCES

[75] Inventor: Nigel C. Hamley, Esher, England

[73] Assignee: Transimage International Limited, Hounslow, England

[21] Appl. No.: 6,316

[22] Filed: Jan. 14, 1987

Related U.S. Application Data

[63] Continuation of Ser. No. 670,821, Nov. 13, 1984, abandoned.

[30] Foreign Application Priority Data

Nov. 14, 1983 [GB] United Kingdom ............... 8330329

[51] Int. Cl.$^4$ .................. H04N 5/222; H04N 5/262
[52] U.S. Cl. .................................. 358/181; 358/185; 358/320; 360/36.1
[58] Field of Search ............... 358/181, 185, 311, 320, 358/337, 335; 360/14.1, 14.2, 13, 36.1, 36.2, 61

[56] References Cited

U.S. PATENT DOCUMENTS

| | | | |
|---|---|---|---|
| 3,994,013 | 11/1976 | Lemoine et al. | 358/320 |
| 4,097,907 | 6/1978 | Horstmann | 360/36.1 |
| 4,290,087 | 9/1981 | Bixby et al. | 360/14.1 X |
| 4,296,443 | 10/1981 | Sakamoto et al. | 360/36.1 X |
| 4,532,547 | 7/1985 | Bennett | 358/181 X |

FOREIGN PATENT DOCUMENTS

| | | |
|---|---|---|
| 1513467 | 6/1978 | United Kingdom . |
| 2005510 | 4/1979 | United Kingdom . |
| 2026278 | 1/1980 | United Kingdom . |
| 2036502 | 6/1980 | United Kingdom . |
| 1576623 | 10/1980 | United Kingdom . |
| 2048611 | 12/1980 | United Kingdom . |
| 2078053 | 12/1981 | United Kingdom . |
| 2101445 | 1/1983 | United Kingdom . |
| 2117205 | 10/1983 | United Kingdom . |
| 2119597 | 11/1983 | United Kingdom . |

Primary Examiner—Howard W. Britton
Assistant Examiner—Victor R. Kostak
Attorney, Agent, or Firm—Gottlieb, Rackman & Reisman

[57] ABSTRACT

In order to allow various video signal sources, such as video tape recorders, to be selected for feeding a studio or other installation, a selection apparatus comprises switching apparatus and a time base corrector. The switching apparatus is disposed between the time base corrector and the recorders, and distributes subcarrier and advance sync signals to the recorders while receiving video and audio signals from the recorders and supplying those from the selected recorder to the time base corrector. Thus, the apparatus permits the use of a single time base corrector for a plurality of recorders, as opposed to a corrector for each recorder as was previously necessary.

4 Claims, 4 Drawing Sheets

SELECTION OF VIDEO SOURCES

This application is a continuation of application Ser. No. 670,821, filed Nov. 13, 1984, now abandoned.

BACKGROUND OF THE INVENTION

1. Field of the Invention

The present invention relates to an apparatus for selecting any one of a plurality of video input signals. Such an apparatus is of particular use when is it desired to select video signals from a plurality of video tape recorders (VTR's).

2. Description of the Prior Art

A problem with the selection of video signals from several VTR's is that such machines are relatively unstable when compared with purely electronic video equipment, such as video cameras, vision mixers, and sync pulse generators (SPG's). Because VTR's are electro mechanical machines, the timing of the video signals reproduced therefrom varies, typically by a period of several lines of video signal, despite the fact that the VTR's are synchronized to the electronic video equipment in a television studio or the like. In order to overcome this problem, it is known to provide each VTR with a time base corrector (TBC). A TBC is an apparatus which essentially comprises a memory in which the video signal is written in synchronization with the VTR to which it is connected and from which the video signal is read in synchronization with the sync pulse generator (SPG) of the television studio or the like. Modern TBC's employ digital electronics and have a random access memory, an analog-to-digital convertor, and a digital-to-analog convertor. The analog-to-digital convertor and the write clock of the memory are referenced to the video signal received from the VTR whereas the digital-to-analog convertor and the read clock input of the memory are referenced to the SPG of the television studio. Thus, the output video signal from the TBC can be accurately synchronized to video signals from video cameras and other VTR's provided with respective TBC's, so that switching between the various sources, which is normally carried out during the vertical blanking period, can be performed without any loss of synchronization or break-up of the video signal.

A disadvantage of this known arrangement is that TBC's are very expensive and can cost as much as or more than the VTR's to which they are connected. This is a substantial disadvantage when it is desired to select between several VTR's, as is nowadays common practice in television studios and the like.

British Pat. Nos. 1 513 467, 1 576 623, and 2 026 278 B, published before the priority date of the present application, and British Patent Specification No. 2119597 A, published after the priority date of the present application, disclose various arrangements for providing synchronisation. However, these arrangements are relatively complex and/or unsuitable for use in a profession studio environment.

SUMMARY OF THE INVENTION

According to the present invention, there is provided an apparatus for selecting any one of a plurality of video input signals, comprising switching means for supplying at its output any selected one of the video input signals and time base correction means connected to the output of the switching means.

Surprisingly, it has been found that it is possible to use a single time base corrector to synchronize the outputs of several video tape recorders or the like while performing the switching or selection of the video signals upstream of the time base corrector. Thus, it is possible to reduce the number of TBC's to one for any number of VTR input signals with consequent substantial reduction in cost.

BRIEF DESCRIPTION OF THE DRAWINGS

The present invention will be further described, by way of example, with reference to the accompanying drawings, in which.

DESCRIPTION OF THE PREFERRED EMBODIMENT

The selecting apparatus 10 comprises a switching apparatus 11 and a time base corrector 12. The time base corrector is of the conventional digital type including an analog-to-digital convertor, a random access memory, and a digital-to-analog convertor. The TBC receives station sync reference signals from the sync pulse generator of the television studio or other system with which the selecting apparatus is associated, and supplies video output signals, for instance to a vision mixer. The TBC 12 passes the reference sync signals to the switching apparatus 11, supplies advance sync signals and subcarrier signals to the switching apparatus 11, and receives video signals and drop-out correction (DOC) signals from the switching apparatus. The switching apparatus 11 also supplies the audio output signals to an audio mixer of the studio or the like.

The switching apparatus 11 is shown connected to four video tape recorders VTR A-D, but could be connected to any number of such recorders. The switching apparatus supplies advance sync signals and subcarrier signals to all of the video tape recorders and receives video signals, RF signals, and audio signals from the recorders. The advance sync signals are used to synchronize the recorders such that they are framelocked in advance of the sync pulse generator of the studio usually by four horizontal lines. The subcarrier signals are used to lock the subcarrier generators in the recorders to the frequency and phase of the subcarrier generated in the studio. The RF signals are provided by amplifying the output directly from the video heads of the recorders. When a drop-out occurs, for instance as a result of loss of magnetic coating from a video tape, the envelope of the RF signal is reduced and this is detected in the TBC 12. The video signal for the previous horizontal line is then repeated so as to mask the effects of the drop-out.

Figure 1:
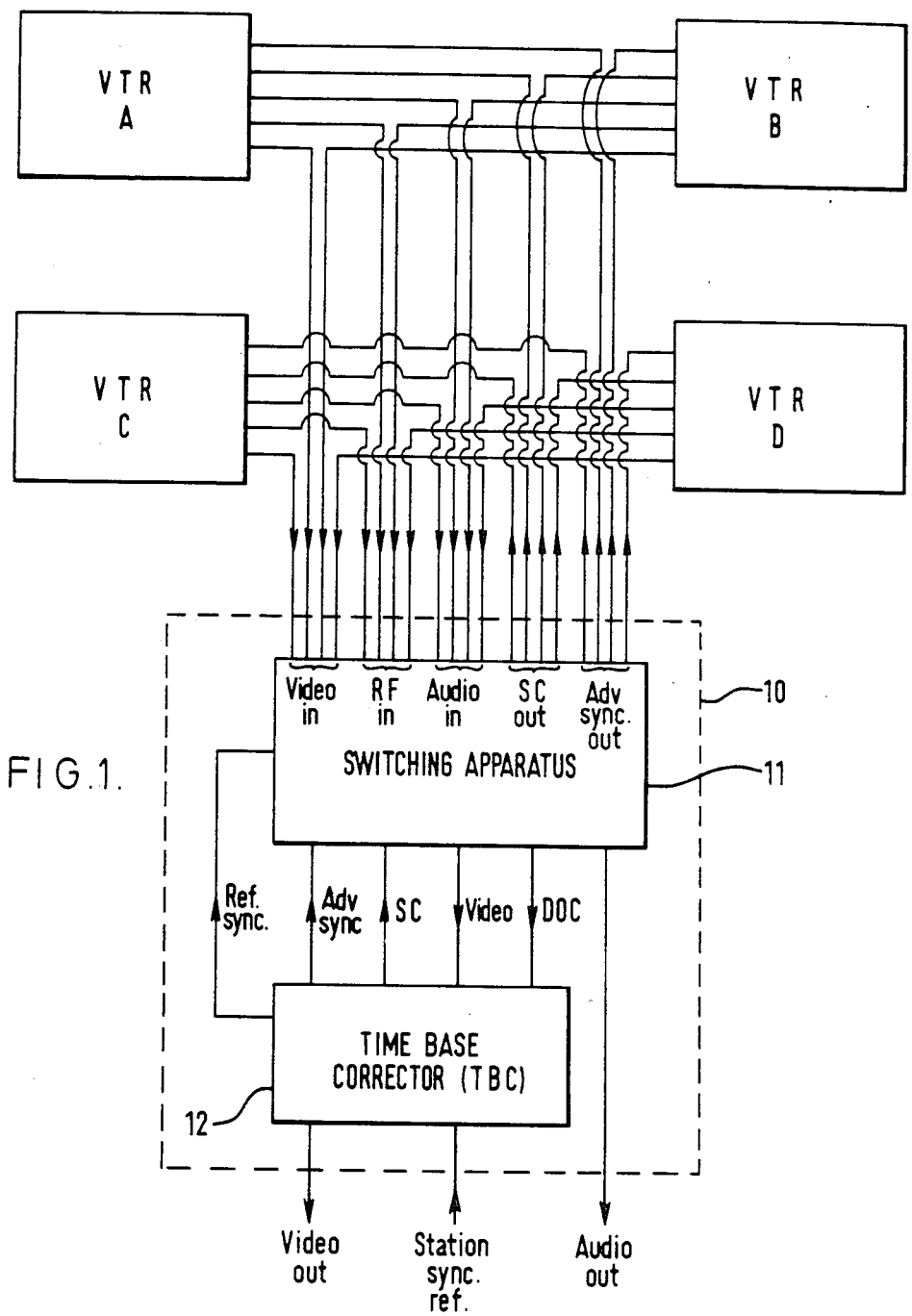
FIG. 1 is a block diagram illustrating connections to an apparatus constituting a preferred embodiment of the present invention.
Figure 2:
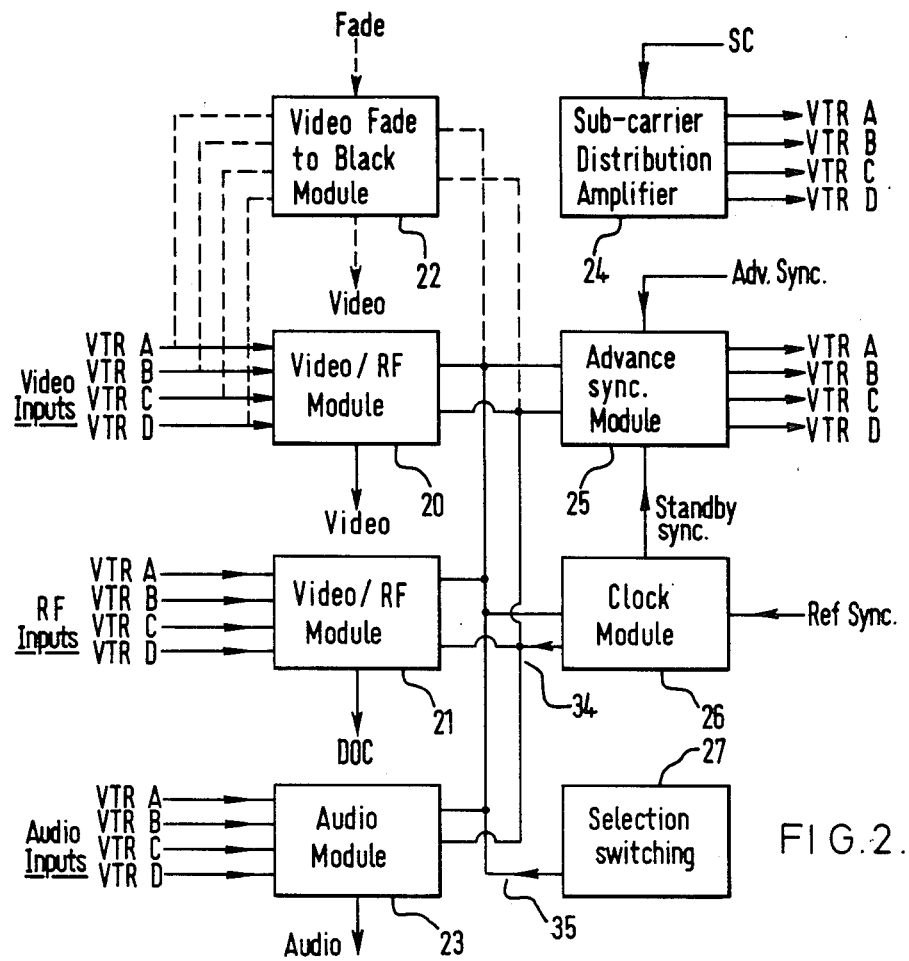
FIG. 2 is a block circuit diagram of the apparatus shown in FIG. 1.

FIG. 2 shows the switching apparatus 11 of FIG. 1 in more detail. This apparatus comprises two identical video/RF modules 20 and 21, the first of which is used to switch the video signals from the recorders VTR A-D to the video output and the second of which is used to switch the RF signals from the recorders to the drop-out compensation output. As a possible alternative to the module 20, a video fade to black module 22 may be provided. The apparatus further comprises an audio module 23 which switches the audio signals from the recorders to the audio output, a subcarrier distribution amplifier 24 which amplifies and distributes the subcarrier signals to the recorders, an advance sync module 25, a clock module 26, and selection switching 27 for selecting which of the recorders VTR A-D is to supply signals to the time base corrector 12. The advance sync module is capable of providing several different synchronization modes, and receives stand-by sync signals from the clock module 26.

Figure 3:
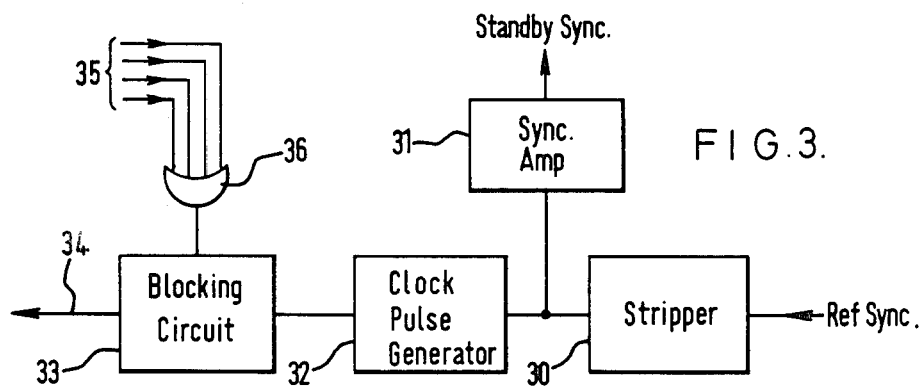
FIG. 3 is a block diagram of a clock module shown in FIG. 2.

The clock module 26 is shown in more detail in FIG. 3, and it will be assumed for the purpose of illustration that the reference sync signals comprise a composite sync signal. However, the clock module could also accept reference video signals, in which case it would be necessary to strip off the video signal to obtain the composite sync signal.

The composite sync signal is supplied to a stripper 30 which strips off the horizontal sync pulses to leave the vertical sync pulses. These sync pulses are amplified in the sync amplifier 31 and are supplied as stand-by sync pulses to the advance sync module 25. The vertical sync pulses are also supplied to a clock pulse generator 32 which supplies a comparatively narrow clock pulse in response to the arrival of each vertical sync pulse.

The output of the generator 32 is supplied to the input of a blocking circuit 33 whose output is connected to a clock line 34, also shown in FIG. 2. The clock pulses are supplied to all of the modules except the subcarrier distribution amplifier 24 shown in FIG. 2.

The selection switching 27 similarly supplies recorder selection signals on a four line bus 35 to all of the modules except the distribution amplifier 24 in FIG. 2. In particular, a logic level one signal is supplied on one of the lines of the bus 35 at a time corresponding to a respective one of the recorders VTR A-D. The four lines of the bus 35 are connected to respective inputs of a OR gate 36, whose output is connected to a blocking input of the blocking circuit 33. The logic level one signal provided by the selection switching exists for a period of at least one television field on the respective line, so that the blocking circuit 33 passes at least one pulse from the generator 32 onto the clock line 34 whenever a recorder is selected or a different recorder is selected.

Figure 4:
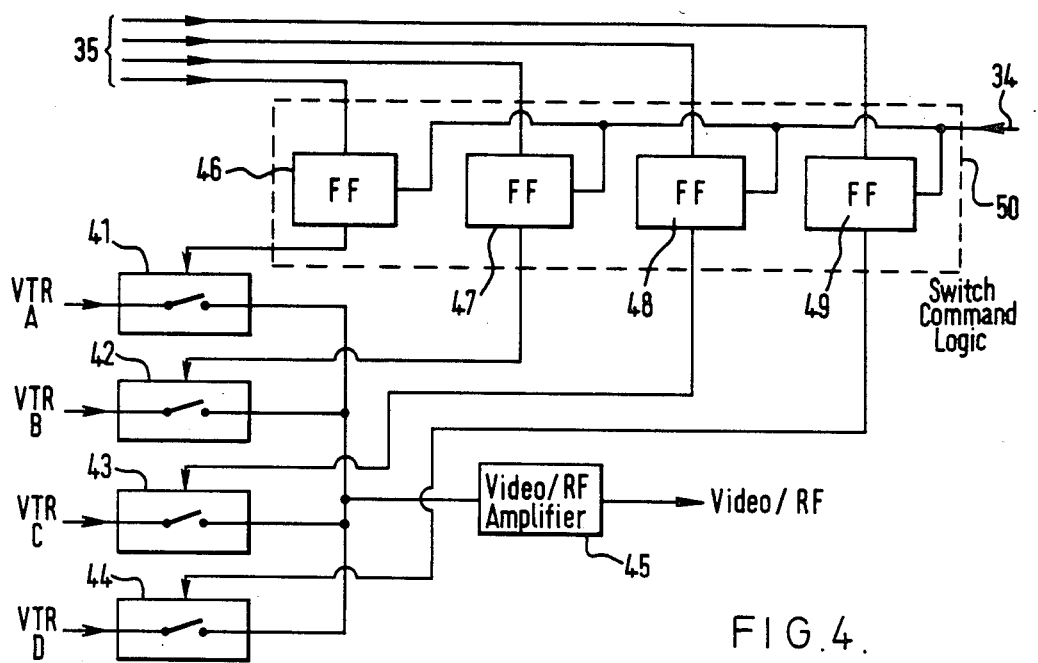
FIG. 4 is a block diagram of a video or RF module shown in FIG. 2.

FIG. 4 shows in more detail the video/RF module 20 or 21 of FIG. 2. This module comprises four electronic switches 41 to 44 which receive the video signals from the recorders VTR A-D, respectively. The outputs of the switches 41 to 44 are connected together and to the input of a video/RF output amplifier 45, whose output provides the video or RF signals to the time base corrector 12.

The control inputs of the switches 41 to 44 are connected to the Q outputs of flip flops 46 to 49, respectively. These flip flops constitute a switch command logic 50, and similar arrangements are used in others of the modules of the switching apparatus 11. The data inputs of the flip flops are connected to respective lines of the bus 35, whereas the clock inputs of the flip flops are connected together and to the clock line 34.

Whenever a video tape recorder is selected or the selection is changed, a logic level one appears on the corresponding line of the bus 35 and is supplied to the data input of the corresponding flip flop. A clock pulse is received on the clock line 34 during the vertical blanking period, and the logic level one is thus clocked into the corresponding flip flop. This ensures that selection or reselection of a recorder occurs during the vertical blanking period and thus does not create any visual disturbance. Logic level zeros are clocked into the other flip flops, so that the corresponding one of the switches 41 to 44 is closed and the other switches are open, thus passing the video or RF signal from the selected or newly selected recorder to the video or RF output via the amplifier 45.

Figure 5:
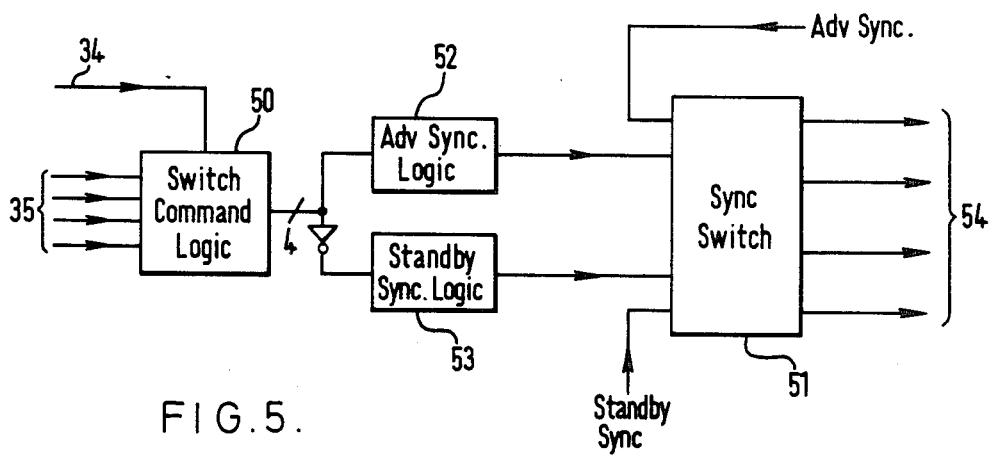
FIG. 5 is a block diagram of an advance sync module shown in FIG. 2.

FIG. 5 shows the advance sync module 25 of FIG. 2 in more detail. This module comprises a sync switch 51 which receives the advance sync signals from the time base corrector 12 and the stand-by sync signals from the clock module 26. The sync switch is controlled by advance sync logic 52 and stand-by sync logic 53. These circuits receive switching signals from a sync command logic 50 which is identical to that shown in FIG. 4. The stand-by sync logic 53 receives these signals via respective invertors (only one shown in FIG. 5).

The advance sync module may operate in any one of three modes, according to the needs of equipment to which the selection apparatus is connected. In the first mode, advance sync signals are distributed by the module on all four outputs 54 to all of the video tape recorders. This mode is the one which would normally be used.

In the second mode, the module supplies the advance sync to the presently selected video tape recorder, whereas the other recorders receive the stand-by sync. This mode of operation may be used when the time base corrector supplies a steering advance sync output. As a possible alternative to supplying the stand-by sync signals, the advance sync module could receive an average advance sync signal for distribution to the non-selected recorders, this average sync signal having a timing which is intermediate the extremes of the sync signals supplied at the steering sync output of the time base corrector.

In the third possible mode, the module 25 supplies stand-by sync signals to all of the recorders. This mode may be used if the time base corrector fails to operate or is not needed and is by-passed, and prevents the recorders from going completely out of synchronization in the absence of sync pulses.

Figure 6:
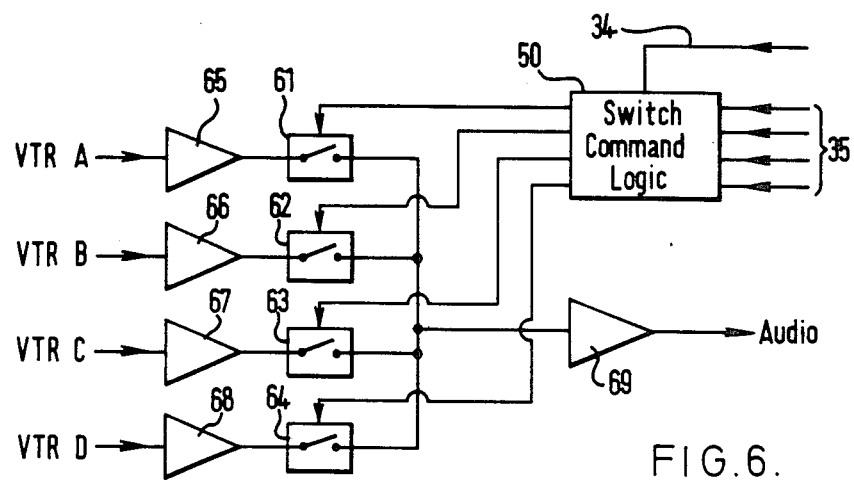
FIG. 6 is a block diagram of an audio module shown in FIG. 2.

FIG. 6 shows in more detail the audio module 23 of FIG. 2, which module includes a switching command logic 50 identical to that shown in FIG. 4. The switching signals from the circuit 50 are supplied to respective electronic switches 61 to 64, whose inputs are connected via respective buffer amplifiers 65 to 68 to the audio outputs of the respective video tape recorders. The outputs of the switches 61 to 64 are connected together and to an output amplifier 69. Thus, the audio signals are switched in synchronism with the video signals from the recorders. Although the audio module 23 is not essential to the selection apparatus, since the switching of the audio signals could be performed elsewhere and need not be performed precisely during the vertical blanking period, the presence of this module improves the utility of the selection apparatus.

Although FIG. 6 shows only one audio signal line for each video tape recorder, it should be understood that the circuit elements 61 to 69 could be repeated so as to provide a stereo pair for use with video tape recorders having stereo audio outputs. Also, the amplifiers 65 to 69 may incorporate electronic gain controls of the voltage-controlled type to permit adjustment of levels and of balance between stereo channels.

Figure 7:
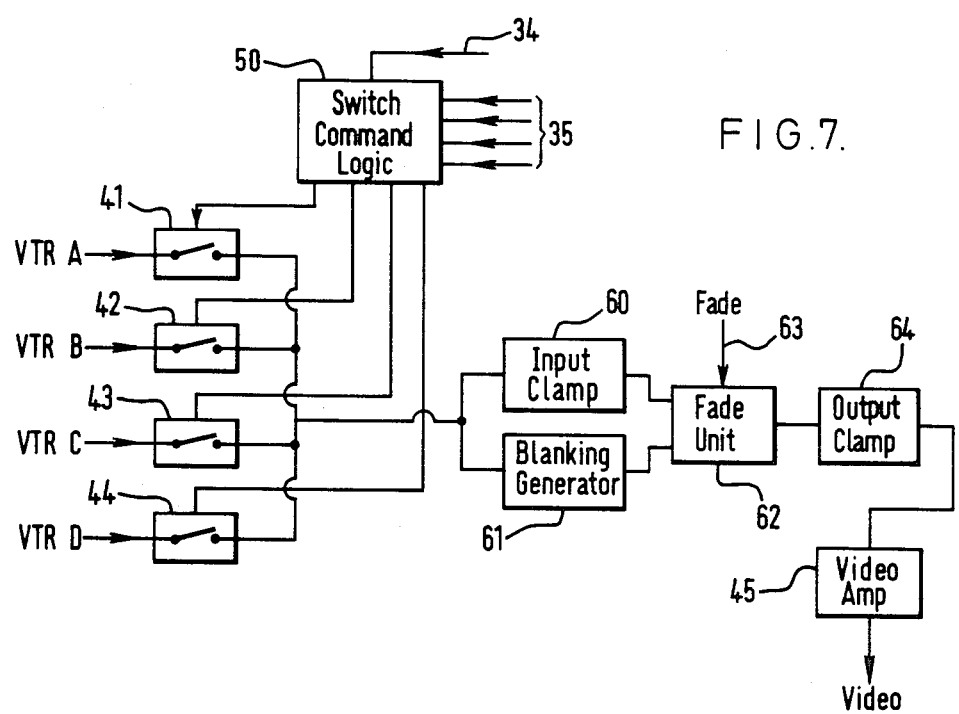
FIG. 7 is a block diagram of a video fade to black module shown in FIG. 2.

FIG. 7 shows in more detail the video fade to black module 22 of FIG. 2. This module is similar to that shown in FIG. 4 and differs therefrom in that a video fading arrangement is connected between the switches 41 to 44 and the output amplifier 45. Accordingly, only the video fading arrangement will be described. The fading arrangement comprises an input clamp 60 and a blanking generator 61, both of which receive the video signal from the switches 41 to 44. The outputs of the clamp 60 and the generator 61 are connected to a fade unit 62 which also receives a fade command signal on an input 63. The output of the fade unit 62 is connected to the input of an output clamp 64, whose output is connected to the video output amplifier 45.

The input clamp 60 clamps the black level of the input video signal and supplies the whole of the signal to the fade unit 62. The blanking generator 61 supplies a blanking signal which commences immediately before each vertical or horizontal blanking period and ends with the respective period. The fade unit 62 comprises an attenuator whose attenuation is controlled by the signal on the line 63. This attenuator is switched out of circuit when it receives blanking pulses from the generator 61 so that the vertical and horizontal sync pulses and the colour burst signal are passed without attenuation, whereas the video signal proper is attenuated in accordance with the signal on the input line 63. The output clamp 64 then clamps the black level of the signal, which is supplied by the amplifier 45 to the time base corrector.

The selection apparatus thus allows the four video tape recorders VTR A-D to be connected to a vision mixer or other electronic apparatus by means of a single time base corrector, thus removing the need for three other time base correctors which would have been necessary in previously known arrangements. This greatly reduces the cost of interfacing the recorders to other electronic equipment while permitting perfect synchronization to be maintained. Use of the selection apparatus also reduces significantly the cabling requirements, thus simplifying installation and again reducing cost.

Although the selection apparatus has been described as a "discrete" piece of equipment, it could also be incorporated in other equipment, for instance in a vision mixer or switch or in a master control unit. Such a combination can also have advantage in reducing cabling and complexity of installation.

I claim:

1. An apparatus for selecting any one of a plurality of horizontally unsynchronised video input signals from a plurality of horizontally unsynchronised video signal sources, said apparatus comprising: selection means for supplying a selection signal indicative of any one of the horizontally unsynchronised video input signals to be selected; switching means having a plurality of inputs for receiving the plurality of horizontally unsynchronised video input signals, respectively, and an output, said switching means being connected to said selection means so as to receive said selection signal and being arranged, in response to said selection signal, to supply at said output a selected one of said horizontally unsynchronised video input signals; time base correction means having an input connected to said output of said switching means, a reference input for receiving an external synchronisation reference signal, and an output, said time base correction means being arranged to supply at said output a video output signal comprising the selected one of the horizontally unsynchronised video input signals horizontally synchronised to the external synchronisation reference signal; and advance synchronisation signal supplying means for supplying an advance synchronisation signal, which is advanced with respect to the external synchronisation reference signal, to the plurality of horizontally unsynchronised video signal sources for vertically synchronising the plurality of horizontally unsynchronised video signal sources.

2. An apparatus as claimed in claim 1, wherein said switching means includes gating means for preventing a change of selection of the horizontally unsynchronised video input signals at a time outside each vertical blanking period defined by the external synchronisation reference signal.

3. An apparatus as claimed in claim 2, wherein said switching means comprises: a plurality of switch means, each comprising an electronic switch controlled by a flip-flop having a data input connected to said selection means and a clock input; and a common clock line connecting said clock inputs of said flip-flop to said gating means, said gating means supplying a pulse to said common clock line during each vertical blanking period of the external synchronisation reference signal.

4. An apparatus as claimed in claim 3, wherein said gating means comprises pulse generating means for generating a clock pulse during each vertical blanking period of the external synchronisation reference signal and blocking means for passing the clock pulse from said pulse generating means to said common clock line in response to a selection signal from said selection means indicating a change of selection of the horizontally unsynchronised video input signals.

* * * * *